Patented Oct. 29, 1946

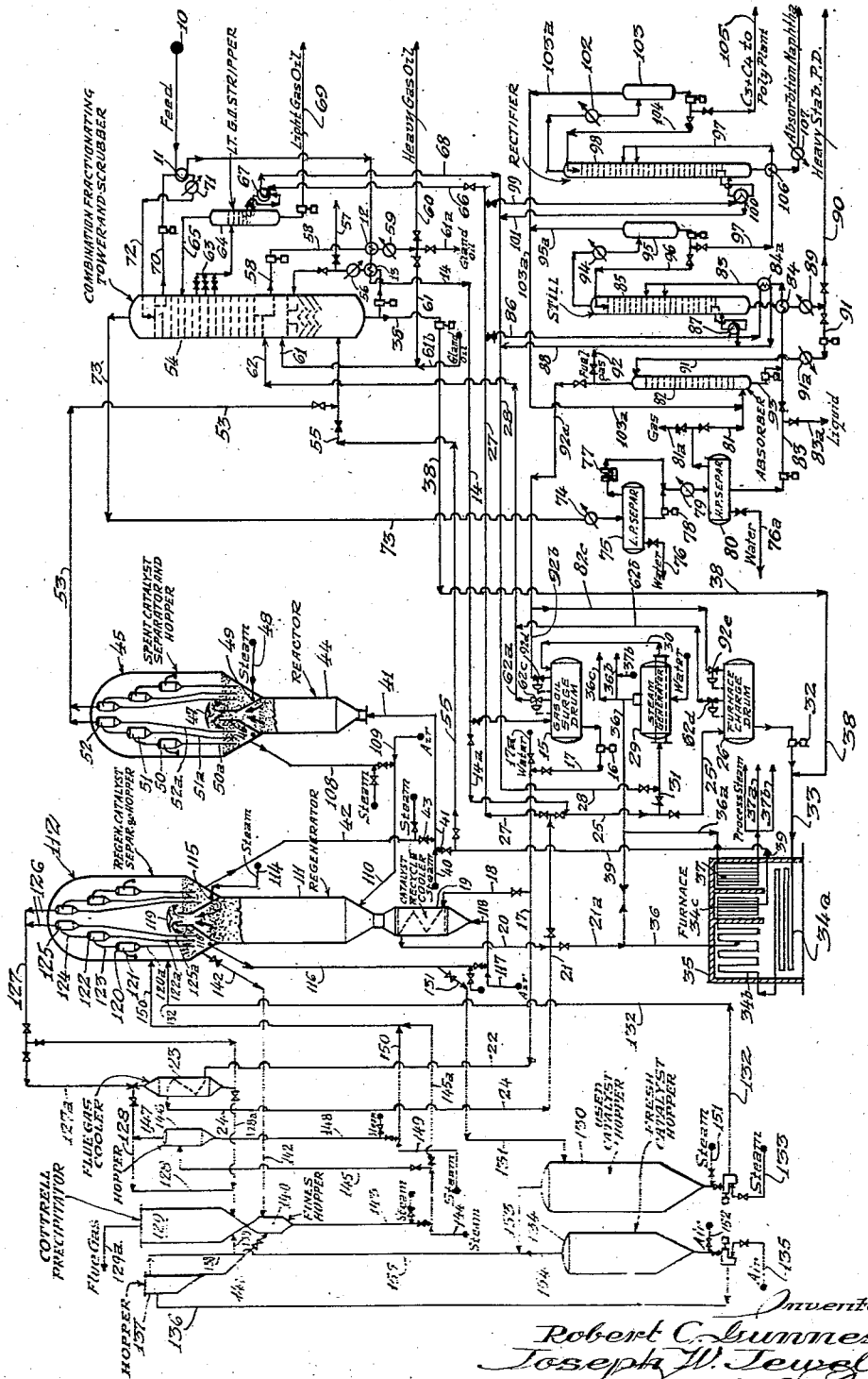

2,410,284

UNITED STATES PATENT OFFICE 2,410,284

CATALYTIC CRACKING SYSTEM

Robert C. Gunness, Chicago, Ill., and Joseph W. Jewell, Summit, N. J., assignors of one-half to Standard Oil Company, a corporation of Indiana, and one-half to The M. W. Kellogg Company, a corporation of Delaware Application April 24, 1941, Serial No. 390,204

6 Claims. (Cl. 196—52)

This invention relates to a catalytic cracking system and it pertains more particularly to a large scale commercial method and means for effecting catalytic cracking in a powdered or fluid-type catalyst system.

In the powdered or fluid-type catalyst system a powdered catalyst effects the conversion of gas oil or heavier hydrocarbons into gasoline while the catalyst is suspended in hydrocarbon vapors. Spent catalyst is separated from reaction gases and vapors and is then suspended in a regeneration gas whereby carbonaceous deposits are removed from the catalyst by controlled oxidation. Regenerated catalyst is then separated from regeneration gases and returned to the cracking step.

Various proposals have been made for the design of commercial cracking systems along the above lines but the actual use of the process has heretofore been limited to experimental or laboratory systems. An object of our invention is to provide a fluid-type catalytic cracking system for large commercial units, e. g., a unit which will convert about 10,000 barrels per day of charging stock into large yields of high quality naphthas which may be marketed as premium motor fuels or which may form base stocks for aviation gasoline.

One problem in the design of commercial fluid-type catalytic cracking systems is that of utilizing the heat developed in the regeneration step. An object of our invention is to provide an improved method and means for solving this problem. Our object is to provide a unitary system wherein a minimum amount of extraneous heat or energy will have to be supplied, wherein the excess heat in reaction products, regeneration gases and recycled regenerated catalyst is most effectively utilized for supplying heat to the fractionation system, for preheating charging stock, for generating steam, etc. A further object is to provide a method and means for obtaining accurate temperature control in all parts of the system and/or minimizing the expense of heat exchangers and heating and cooling equipment.

A very serious problem in the operation of a fluid catalyst cracking system is that of storing and handling the powdered catalyst, maintaining the catalyst fluent in all parts of the system, preventing undue catalyst attrition, minimizing catalyst losses and transferring catalysts from low pressure zones to high pressure zones without the use of mechanical impellers which are characterized by low efficiency and which become rapidly worn by erosion or abrasion when called upon to handle the catalyst powder. An object of our invention is to provide a commercial system wherein catalyst is pneumatically transferred from low levels to high levels and wherein it flows by gravity from high levels to low levels throughout the entire system.

A further object is to prevent the loss of catalyst not only from reactor and regenerator gases but from aeration gases and pneumatic conveyor gases throughout all parts of the system and to remove even finely divided dust from all gases vented from the system. A further object is to provide improved methods and means for handling and utilizing the dust which is separated from vented gases. A further object is to provide an improved system of upper and lower catalyst hoppers, cyclone separators, etc. with an electrostatic precipitator so that the entire system will function smoothly and efficiently without overloading at any point and without undesirable surges in pressure or losses in heat. A further object is to provide improved methods and means for obtaining a substantially uniform mixture of regenerated catalyst from various separation systems so that the distribution of particle sizes of catalyst entering the reactor is always substantially the same.

A further object is to provide an improved general layout for a fluid-type catalytic cracking system whereby the reaction, regeneration and fractionation parts of the system are all integrated to form a unit of maximum efficiency. A further object is to insure the operation of this unitary system and all parts thereof under optimum conditions of temperature, pressure, catalyst density, etc., in order that maximum gasoline yields may be obtained, a minimum amount of carbon may be deposited on the catalyst, valuable gas oil fractions may be obtained from the heavier-than-gasoline products, and gas production (particularly the production of methane, ethane and ethylene) may be reduced to a minimum. Other objects of the invention will be apparent as the detailed description thereof proceeds.

In broad outline our invention contemplates a vertical up-flow reactor chamber which discharges into an enlarged settling zone at the base of which is an "upper hopper" for spent catalyst and in the top of which are centrifuges for removing practically all of the catalyst from gases and vapors before they leave the settling zone. Catalyst is suspended in incoming hydrocarbon vapors, carried by said vapors into the base of the reactor, and maintained at a density about 10 to 25, preferably 15 to 18 pounds per cubic foot within the reactor at a temperature of about 800 to 1000° F., preferably 900 to 950° F. and a pressure of about atmospheric to 50 pounds, preferably 8 to 15 pounds per square inch. The catalyst-to-oil ratio in the incoming stream may range from about 1:1 to about 8:1 but is preferably about 4:1. The average vapor contact time in the reactor may be about 4 to 40 seconds, preferably about 10 to 20 seconds. The average vapor velocity through the reactor may be about 0.4 to 4, preferably about 1.5 to 2 feet per second.

The regenerator is a much larger up-flow chamber which is likewise superimposed by an enlarged settling zone at the base of which is an upper hopper for regenerated catalyst and in the top of which are centrifugal separators for removing unsettled catalyst from reaction gases before they leave the top of the settling zone. Spent catalyst is introduced to the lower part of the regenerator by means of air and the average vertical velocity of air and combustion gases in the regenerator is about 0.4 to 4.0, preferably about 1.5 or 2 feet per second so that the catalyst density in the regenerator is about 10 to 25, preferably 18 to 20 pounds per cubic foot. A large amount of regenerated catalyst from the upper hopper is recycled through a catalyst cooler to the regenerator and is reintroduced thereto at a temperature of about 750 to 900, preferably about 840° F. Spent catalyst may enter at about 850 to 950° F., preferably about 900° F. The average temperature of catalyst entering the regenerator may be about 850° F. The regeneration may be effected at a temperature of about 950 to 1050° F., preferably about 1000° F. and under a pressure of atmospheric to 50 pounds, preferably about 8 to 16 pounds per square inch. The amount of air required for returning recycled catalyst to the regenerator, introducing spent catalyst into the regenerator and supporting combustion in the regenerator may be about 13 to 15% by weight of the spent catalyst which is charged to the regenerator but will depend of course on the amount of carbonaceous material that must be burned from the catalyst.

Catalyst is maintained in fluent form in all hoppers, standpipes, etc., by means of an inert aeration gas which is usually steam. Aeration gas from all parts of the fresh and regenerated catalyst system is passed through a Cottrell precipitator for the removal of catalyst dust so that catalyst losses are reduced to a minimum. Fresh catalyst may be transferred to an upper hopper and mixed with Cottrell fines before being admixed with regenerated catalyst and charged to the system.

The finer catalyst particles separated by the Cottrell precipitator and by cyclone separators is either agglomerated, reconditioned, or thoroughly mixed with coarser catalyst particles so that a uniform catalyst mixture is introduced into the reactor.

The last traces of catalyst may be separated from reaction products in a combination fractionating and scrubbing tower and returned with a small amount of the heavy oil fraction to the reaction zone.

The gas oil feed passes through various heat exchangers to a surge drum or furnace charge drum. If the surge drum is employed gas oil may be cycled therefrom through heat exchangers for absorbing heat from hot regeneration gases and regenerated catalyst. A part of this heated gas oil may go to the furnace charge drum and another part may supply heat in the fractionation and steam generation system. We may, however, eliminate the surge drum and generate steam directly in regeneration gas or recycle catalyst exchangers.

The product fractionation system may thus receive heat from the regeneration system and it may likewise recover traces of catalyst from product gases so that such catalyst may be returned to the reactor. Reaction products are preferably introduced at the base of a combination fractionating tower and scrubber which may be operated at a pressure of about 5 pounds gauge. We may separately remove one or more gas oil fractions as side streams from this tower and a slurry of recovered catalyst in heavy oil as a bottom fraction. We may utilize the heat from the bottom fraction for preheating charging stock and then for the preheating of water from which steam is to be generated. Also, we may utilize the heat from this bottom fraction or from a clean heavy gas oil withdrawn from a point adjacent the tower for reboiling or stripping one or more of the gas oil side streams. The cooled bottoms or heavy gas oil fractions may then be returned to the top of the scrubbing section of the tower for maintaining the desired temperature at this point in the fractionation system.

The gasoline and gases which are taken overhead from the combination fractionating tower and scrubber may be cooled and compressed to a pressure of about 135 to 150 pounds per square inch. After the removal of water the compressed gases and liquids may be charged to a fractionation system forming a part of the unit or may be charged to other fractionation systems which may form a part of the refinery in which the unit is located.

The invention will be more clearly understood from the following detailed description read in conjunction with the accompanying drawing which forms a part of the specification and which constitutes a schematic flow diagram of our improved system.

The invention will be most clearly understood from the detailed description of a preferred embodiment but it should be understood that the invention is not limited to the specific charging stocks, operating conditions, and features herein described. The charging stock may be any gas oil or heavier hydrocarbon distillate which is obtained from natural crude petroleum or from hydrocarbon synthesis or from hydrocarbon conversion processes. The operating conditions will necessarily depend upon the activity and physical properties of the specific catalyst and the extent of conversion which is desired. Many modifications and alternatives of the details herein set forth will be apparent from this detailed description to those skilled in the art.

The catalyst is preferably of the silica-alumina or silica-magnesia type and may be prepared by the acid treating of natural clay such as bentonite, exemplified by the commercial "activated" clay "Super-Filtrol," or by synthetically preparing a powdered silica-alumina or silica-magnesia mixture. An excellent catalyst may be prepared by ball-milling silica hydrogel with alumina or magnesia using about 2 to 30%, for example about 15% of alumina or magnesia. The ball-milled dough may be dried at a temperature of about 240° F. and then activated by heating to a temperature of about 900 to 1000° F.

Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing, after which it is dried and heated as in the previous example. The silica alumina catalyst may be rendered more stable at high temperatures by the addition thereto of zirconia in either smaller or larger amounts than alumina.

The ball-milled silica magnesia catalyst may be improved by pretreating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition of catalyst per se and no further description of the catalyst is therefore necessary.

The catalyst in this specific example is in powdered form with a particle size of about 10 to 100 microns, i. e., with about 50% of the catalyst passing about a 400 mesh screen. The invention is applicable, however, to other catalyst sizes provided only that the catalyst be of such sizes and density that it may be aerated and handled as a fluid in the manner herein described.

The feed stock from source 10 may be a Mid-Continent gas oil or a mixture of such gas oil with the gas oil seperated from catalytic or thermal conversion products and in the example herein described the charge may consist of 7500 barrels per day of virgin gas oil and 2500 barrels per day of gas oil from refinery conversion systems. This charging stock may have a gravity of about 30 to 35, for example, 31.1° A. P. I. so that the charging rate may be about 126,800 pounds per hour. The stock may enter heat exchanger 11 at about room temperature and leaves this exchanger at about 200° F. It may be further heated in exchanger 12 to about 290° F. and then by exchanger 13 to about 450° F. at which temperature it may be introduced through line 14 to gas oil surge drum 15 which may be at a pressure of about 25 pounds per square inch. This drum may be about 8 to 10 feet in diameter by 20 feet long.

A part of the gas oil which is pumped from drum 15 by pump 16 through line 17 may be passed by line 18 around the tubes of catalyst cooler 19 and returned by line 20 to line 21. Another part of the gas oil pumped by pump 16 through line 17 may pass through line 22, through flue gas cooler 23 and thence by pipe 24 to line 21. The stream from line 21 is split, a part of it passing by line 25 to furnace charge drum 26 and a part passing through line 27 to various heaters in the fractionation system. After it has supplied heat in the fractionation system this gas oil is returned through line 28 to steam generator 29 and thence back through line 30 to storage drum 15. The temperature of the gas oil leaving heat exchangers 19 and 23 is about 600° F., the temperature of the gas oil returning from the fractionation system through line 28 is about 528° F. and it is admixed with sufficient amount of hot gas oil from line 25 and line 31 so that the gas oil entering the steam generator is about 550° F. The gas oil leaving the steam generator is about 450° F. While a single steam generator is shown in the drawing it should be understood that a plurality of such generators may be employed. Also, it should be understood that the temperatures of the gas oil at various points in the system may vary and may be different than those stated in this specific example.

Charging stock from drum 26 is introduced by pump 32 and line 33 into coils 34a of pipe still 35. This pipe still may be designed with three downwardly fired radiant sections and a lower convection section. The charging stock from line 33 may be first passed through tubes 34a in the convection section and then through tubes 34b in the first downwardly fired radiant section. Steam from generator 29 is passed by line 36 to coils in this radiant section and we may introduce an amount of steam equivalent to about 5% by weight of the stock charged. The oil may enter coils 34b at about 775° F. and about 75 pounds per square inch and may leave these coils at a temperature of about 840° F. and a pressure of about 30 pounds per square inch. In coils 34b the charging stock is completely vaporized, the introduced steam assuring complete vaporization.

After complete vaporization in series flow through coils 34b the charge is superheated while passing in parallel flow through coils 34c in the second downwardly heated radiant section of the furnace. The pressure drop through coils 34b is relatively low and superheated vapors may leave these coils at a temperature of about 900 to 1000° F., for example about 915° F., at a pressure of about 18 to 20 pounds per square inch gage.

The third downwardly heated radiant section of the furnace is employed for superheating steam to a temperature of about 900° F. or more. The steam may be introduced into the superheating coils through line 36a, passed through superheating coils 37 and then distributed to various parts of the system through the line designated "process steam." To avoid unduly complicating the drawing these process steam distributing lines will be omitted and we will merely indicate the points throughout the system at which process steam is introduced. A part of this super heated steam may be passed through line 37a for supplying heat or energy in the system or elsewhere and another part may be passed through line 37b for admixture with steam from generator 29 and line 36b. A part of the steam from generator 29 may thus be superheated to various levels for any desired use and another part of this steam may be passed by line 36c for supplying heat or generating power in this or any other system.

It should be stated that the charging stock to coils 34a may include about 500 barrels per day of about 20° A. P. I. product bottoms containing about 1100 to 1200 or more pounds per hour of powdered catalyst, this slurry being introduced through line 38.

In addition to the steam introduced through line 36, steam may be introduced into the transfer line 39 through line 40 in amounts of about 4 or 5% by weight of charging stock. The transfer line vapors then pass through line 41 wherein they pick up powdered catalyst from standpipe 42. This standpipe may be about 25 or 26 inches inside diameter by about 66 or 67 feet high. The pressure above slide valve or star feeder 43 may be about 19 or 20 pounds per square inch and the pressure in line 41 at this point may be about 14½ or 15 pounds per square inch. The amount of catalyst so introduced into the hydrocarbon vapors is preferably such as to give a catalyst-to-oil weight ratio of about 4:1 to 5:1 for example about 630,000 to 635,000 pounds per hour of catalyst may be picked up by the vapor stream at this point. The temperature of this catalyst may be about 950 to 1050° F. and the oil temperature be controlled so that the suspended catalyst-oil-mixture may have a temperature of about 950 to 1000° F. This mixture may be introduced into the reactor at a pressure of about 13 pounds per square inch.

The density of the catalyst in entering vapor stream may only be about 1 pound per cubic foot but the catalyst tends to settle into a dense turbulent suspended catalyst phase in the reactor the density of which phase may be about 15 to 18 pounds per cubic foot. Due to the turbulence, i. e., the "internal recycling" occurring in this dense catalyst phase a substantially uniform temperature prevails throughout the reactor which temperature may be about 900 to 950° F. The reactor may be a cylindrical vessel about 12 or 13 feet inside diameter and about 25 feet high with cone tops and bottoms as illustrated in the drawing. The average vertical vapor velocity in the reactor may be about 1 to 3 feet per second, preferably about 1½ to 2 feet and the average vapor contact time may range from about 5 to 40 seconds or more, usually about 10 to 16 seconds.

Superimposed above the reactor we provide an enlarged settling chamber 45 which may be about 15 or 16 feet inside diameter by about 35 to 50 feet high. The settling chamber is provided with a cone-shaped bottom which co-acts with the top sides and discharge pipe 46 of the reactor to form an upper hopper for settled and separated catalyst. Pipe 46 may be about 5 or 6 feet in diameter and above this pipe we may provide a baffle 47 for distributing reaction gases and vapors together with suspended catalyst throughout the cross-sectional area of the catalyst separator, thus preventing any chimneying effect. The density of catalyst in pipe 46 may be only about .6 pound per cubic foot. The vertical upward velocity of gases and vapors in separator 45 may be about 1½ to 2 feet per second. About 1000 to 2000 pounds per hour of process steam is introduced through line 48 and distributor 49 for maintaining settled catalyst in aerated condition and for stripping products therefrom. The low velocity of these aeration or stripping gases, however, permits the catalyst to settle in the upper hopper space and to assume a density of about 25 pounds per cubic foot.

In order to remove as much catalyst as possible from reaction gases before they leave this separation zone we prefer to employ a series of cyclone separators 50, 51 and 52 in chamber 45 each of the separators being provided with dip legs 50a, 51a, and 52a extending well below the level of the settled catalyst in the upper hopper. With a pressure in the upper hopper of about 9 pounds per square inch we may have a pressure in primary cyclone 50 of about 8½ pounds, in secondary cyclone 51 of about 8 pounds, and in tertiary cyclone 52 of about 7½ pounds. The difference between the pressure in chamber 45 and in these cyclones is balanced by the head of settled catalyst in the respective dip legs.

By employing four cyclones in each stage we may remove about 45,000 pounds per hour of catalyst from the first stage, about 4,000 pounds per hour from the second and about 1,000 pounds per hour from the third so that the final gases leaving the separation zone through line 53 will contain only about 800 to 1,200 pounds of unrecovered catalyst per hour.

The products are introduced at the base of a combination fractionating tower and scrubber 54 which is preferably operated at about five pounds gauge pressure with a bottom temperature of about 590° F. and a top temperature of about 240° F. A line 55 may be provided for by-passing the charge around the reactor if for any reason the reactor is shut down. The vertical velocities in the reactor may be controlled to a certain extent by varying the amount of steam which is introduced into the charging stock vapors or by by-passing some of the charging stock vapors directly to the fractionating tower or by varying the quantity of charge. If the pressure at the base of standpipe 42 falls below safe limits the charging stock is automatically diverted through line 55 by means of a pressure controlled valve so that there can be no possibility of charging stock vapors flowing upwardly in the standpipe and entering the space above the regenerator.

In the base of tower 54 residual catalyst particles are scrubbed out of the reaction products so that they may be returned by line 38 to pipe still coils as hereinabove described. For each volume of bottoms which are so withdrawn we prefer to recycle about 25 or 30 volumes through heat exchanger 13 and one or more coolers 56 back to the scrubbing section of the tower in order to maintain a tower temperature at the top of the scrubbing section of about 580° F. One of the coolers 56 or other heat exchangers in the fractionation system may be employed for preheating the water which is charged to steam generator 29. An emergency draw-off line 57 is provided but is generally not used.

A heavy gas oil fraction may be withdrawn from the tower through line 58 and passed through heat exchanger 12 and cooler 59. About 2,400 to 2,500 barrels per day of this 25.6° A. P. I. gas oil may be withdrawn from the system through line 60 and another part reintroduced to the tower through line 61 for maintaining the desired temperature gradient. This stream provides the gland oil for various pumps in the system, such oil being introduced to pump glands through line 61a and returned through line 61b.

Line 62 is provided for venting any excess gas from surge drum 15 or furnace charge drum 26 to an intermediate point in the fractionating tower. Line 62 is connected by line 62a to surge drum 15 and by line 62b to furnace charge drum 26.

Light gas oil is removed from tower 54 through draw-offs 63 and stripped in side stream stripper 64, the overhead being returned through line 65 to tower 54. The heat for effecting this side stream stripping may be obtained from hot gas oil which is introduced from line 27 through line 66 to heat exchanger 67 and is returned through line 68 to line 28. Indirect stripping is desired in view of the large amount of steam already present in tower 54. About 2,400 to 2,500 barrels per day of 35° A. P. I. gravity light gas oil may be withdrawn through line 69.

About 45,000 barrels per day of liquid may be withdrawn through line 70, passed through heat exchanger 11 and cooler 71 and returned through line 72 at a temperature of about 150° F. for refluxing the top of the tower so that the overhead from this tower is at a temperature of about 240° F. Due to the large amount of steam present at this point, substantially all of the 400° F. end point naphtha will thus be taken overhead.

The overhead from tower 54 is passed by line 73 through cooler 74 to primary low-pressure separator 75 which operates at about 100° F. and about atmospheric or 1 pound gauge pressure. Condensed water is removed from this separator through line 76. The gases from this separator are compressed by compressor 77 and the liquids are forced by pump 78 through cooler 79 to high-pressure separator 80. The high-pressure separator is at a temperature of about 100° F. but at a pressure of about 135 to 150 pounds per square inch. Condensed water may be removed from this stage through line 76a. It should be understood that while we have only illustrated two stages of separation we may use three or more stages, i. e., we may employ an intermediate stage with the separator at about 25 pounds pressure and we may withdraw additional water from this intermediate separator.

Gases from the high pressure separator may be withdrawn through line 81a to a separate absorber system or introduced through line 81 into the base of absorber 82. Liquids from the high pressure separator may be pumped through line 83a to a separate fractionation system or may be pumped through line 83 and heat exchangers 84 and 84a to an intermediate point in still 85. The heat for this still may be supplied by gas oil from line 27 and line 86, which leads to heaters 84a and 87, the cooled gas oil being returned through line 88 to line 28. The bottoms from the still pass through exchanger 84 and cooler 89. A part of this stream amounting to about 3,300 to 3,400 barrels per day may be withdrawn through line 90 as a 50.3° A. P. I. heavy naphtha. Another part of this stream is returned by line 91 through cooler 91a to the top of tower 82 for absorbing light hydrocarbons from gases which are withdrawn from the system through line 92 for use as fuel or for any other purpose. Rich oil from the base of the absorber is pumped through line 93 to the still along with liquid from the high-pressure separator 80.

The top of the absorber 82 is connected by lines 92a and 92b to the top of surge drum 15 and by lines 92a and 92c to the top of charge drum 26. A substantially constant pressure is maintained in these drums, i. e., a pressure of about 25 pounds per square inch in drum 15 and about 75 pounds per square inch in drum 26 by gases from absorber 82, valve 92d being controlled in accordance with the desired maximum pressure in drum 15 and valve 92e being controlled in accordance with the desired maximum pressure in drum 26. Valves 62c and 62d are set to relieve at slightly higher pressures than that maintained by 92c and 92b, and since absorber 82 normally operates under a pressure of about 135 pounds per square inch we may maintain any desired lower pressure in the gas oil drums by the use of these gas lines and pressure controlled valves.

The overhead from still 85 is passed through condenser 94 to receiver 95. A part of the condensate is recycled through line 96 for use as reflux in the top of still 85 and another part is passed by line 97 through exchanger 106 to an intermediate point of rectifier or stabilizer 98. The heat for the base of this stabilizer may be obtained by passing gas oil from line 27 and line 99 through heat exchanger 100 and returning the cooled gas oil through line 101 back to line 28. Overhead from tower 98 is cooled in cooler 102 and introduced into receiver 103. A part of this condensate from this receiver is recycled through line 104 for reflux in tower 98. The balance of this condensate, which may amount to about 577 barrels per day, and which consists essentially of $C_3$ or a mixture of $C_3$ and $C_4$ hydrocarbons, is withdrawn through line 105 to a polymerization plant or other system in order that it may be converted into high quality motor fuel or otherwise utilized. The bottoms from tower 98 is withdrawn through heat exchanger 106 and cooler 107. This fraction may amount to about 1600 to 1700 barrels per day of 98.5° A. P. I. absorption naphtha.

To recapitulate, the following products may be produced from the 10,000 barrels per day charge:

| | Barrels per day |
|---|---|
| Heavy gas oil | 2,445 |
| Light gas oil | 2,445 |
| Heavy naphtha | 3,340 |
| Light naphtha | 1,650 |
| $C_3$ and $C_4$ hydrocarbons | 570 |
| Total yield by volume (i. e., 104.5% on stock charged) | 10,450 |

The gases separated from receivers 95 and 103 may be returned by lines 95a and 103a to the base of absorber tower 82. In addition to the large volumetric yield of liquid and liquefied products we obtain about 1,400 to 1,500 pounds per hour of dry gas from fuel gas line 92 and we obtain a considerable amount of heat from the carbon which is deposited on the catalyst. This heat recovery from carbonaceous deposits on catalysts will now be described in further detail.

Spent catalyst is discharged from the upper hopper in chamber 45 to one or more standpipes 108 of a suitable height to maintain the desired pressure which in this case may be about 75 to 80 feet. The pressure above the slide valve at the bottom of this standpipe may be about 22 to 23 pounds per square inch and the temperature of the catalyst may be about 900° F. Compressed air from line 109 is introduced under pressure of about 17 or 18 pounds per square inch and in amounts of about 16,000 to 18,000 pounds per hour for picking up catalyst from the base of the standpipe and carrying it through line 110 to the base of regenerator chamber 111. This regenerator is preferably about 18 feet inside diameter by about 50 feet high.

As in the case of reactor 44 there is an enlarged settling chamber 112 above the regenerator, this settling chamber or separator being about 22 feet inside diameter and about 25 to 40 feet high. The inclined upper walls of the regenerator terminate in pipe 113 and the space between pipe 113 and the walls of chamber 112 form an upper hopper for regenerated catalyst. The catalyst which settles in this upper hopper is aerated by steam introduced through line 114 into distributor 115.

It is essential that the temperature in the regenerator be maintained within safe limits (from the standpoint of catalyst activity), for example 950 to 1050° F. or about 1000° F. A considerable amount of the heat generated by the combustion of carbonaceous deposits must be absorbed in and removed from the regenerator if the temperature is to be held within desired limits. In order to control the temperature in the regenerator we recycle about three times as much catalyst as is introduced through line 110 and we cool this recycled catalyst before it is returned to the regenerator. More specifically we withdraw catalyst from the upper hopper in chamber 112 to one or more standpipes 116, which may be about 95 feet in height and about 2 or 3 feet in diameter. The pressure of the catalyst above the lower valve may be about 24 or 25 pounds per square inch. The catalyst in this standpipe as well as in standpipes 42 and 108 are provided with means for introducing aeration steam so that the catalyst is maintained in fluent condition throughout the entire length of the standpipe.

Compressed air from line 117 is introduced at a pressure of about 19 or 20 pounds per square inch and in amounts of about 71,000 pounds per hour. The compressed air picks up the catalyst from the base of standpipe 116 and conveys it via line 118, through heat exchanger 19 wherein a considerable amount of the heat contained in this recycled catalyst is picked up by gas oil introduced through line 18 and withdrawn through line 20. Heat may be absorbed from the recycled catalyst, by other fluids than gas oil, and if desired steam may be generated directly in this exchanger. The temperature of the suspended recycled catalyst at the base of exchanger 19 may be about 950 to 960° F. and the temperature of the suspended catalyst at the top of this heat exchanger may be about 940° F. or lower.

When this recycled catalyst is admixed with spent catalyst in the base of regenerator 111 the average inlet temperature to the regenerator may be about 850° F. but throughout the body of the regenerator a substantially constant temperature of about 1000° F. will prevail. With the amounts of air, regenerator size, and temperatures as above set forth, the vertical velocity of up-flowing gases in the regenerator should be about 1 to 3, or more precisely, about 1½ to 2 feet per second. The pressure at the base of the regenerator may be about 16 pounds per square inch and the gases may enter the base of the regenerator at the rate of about 400 cubic feet per second. The pressure at the top of the regenerator may be about 9 pounds per square inch and the gases may leave the top of the regenerator at the rate of about 650 cubic feet per second. The average density of the catalyst in the regenerator may be about 18 to 20 pounds per cubic foot.

Baffle 119 distributes the regeneration gases and suspended catalyst uniformly throughout the enlarged separating zone in chamber 112 and the bulk of the catalyst settles out of the gases in this zone.

To obtain more complete catalyst removal we prefer to mount a plurality of cyclone separators in the upper part of the separator. Primary cyclones 120 may pick up gases through inlet pipe 121 in which gases the catalyst content may be about 375 to 400 grains per cubic foot. The gases discharged from these primary cyclones to secondary cyclones 122 through line 123 may contain only about 75 grains of catalyst per cubic foot. The gases which leave the secondary cyclones through line 124 and enter tertiary cyclones 125 may have a catalyst content of only about 36 grains per cubic foot. The gas discharged from the tertiary cyclones through lines 126 and 127 may have only about 20 grains of catalyst per cubic foot or less. It should be understood that any number of cyclones may be employed in the primary, secondary and tertiary stages and that any number of stages may be used without departing from the invention.

Each cyclone has its dip leg 120a, 122a and 125a which extends well below the level of the settled catalyst in the upper hopper and the different heads of catalyst in these dip legs compensate for the difference between the pressure in chamber 112 and the pressures in the respective cyclone separators. The pressure in chamber 112 may be about 8 pounds per square inch, there may be a half pound pressure drop through each cyclone separator and about 5 or 6 pounds pressure drop between the top of the separator zone and the discharge end of heat exchanger 23 so that the gases leave this heat exchanger through line 128 at a pressure of about 1 or 2 pounds per square inch gauge.

Instead of single heat exchanger or flue gas cooler 23 we may employ a plurality of such heat exchangers in parallel or in series. The gases may pass downwardly through the exchanger instead of upwardly, as shown. The flue gases are cooled from about 1000° F. to about 675° F. in these exchangers and the gas oil is heated from about 450 to about 600° F. as hereinabove described. Other heat exchange fluid than gas oil may, of course, be used and the cooling may be to different temperatures than those given in this example.

The gases from line 128 are introduced at the base of Cottrell precipitator 129 at a pressure of about ½ pound per square inch gauge. They are withdrawn therefrom through line 129a to a suitable stack at about atmospheric pressure.

The upper hopper in chamber 112 only holds enough catalyst for about a 5 to 20 minute operation of the reactor and in order to insure a substantially constant catalyst level in this upper hopper we provide a large used catalyst hopper 130 which may be about 20 feet in diameter and about 45 or 50 feet high. If the level in the upper hopper rises above desired limits regenerated catalyst is withdrawn through standpipe 116 and line 131 to the used catalyst hopper 130. If the catalyst level in the upper hopper gets too low, used catalyst from this hopper is introduced into the upper hopper through line 132 by means of process steam introduced through line 133. Thus a substantially constant level of catalyst in the upper hopper is always maintained.

Fresh catalyst is introduced into the system from hopper 134. Instead of introducing this fresh catalyst directly with regenerated catalyst we prefer to first admix it with catalyst fines discharged from the Cottrell precipitator. Fresh catalyst is picked up by air from line 135 and introduced by line 136 to an upper hopper 137 the air being separated from the catalyst in this upper hopper and introduced through lines 138 and 139 into the base of the Cottrell precipitator. The fines from the base of the Cottrell precipitator are discharged into hopper 140 (which may be in the lower part of the precipitator itself) and are there admixed with fresh catalyst introduced from hopper 137 through line 141. The fresh catalyst thus introduced is to replace catalyst losses from the system and it may amount to only about 160 to 170 pounds per hour. This amount of catalyst does not supply the desired amount of coarse material for the fines and we, therefore, introduce about fifty times as much regenerated catalyst from line 142 as is introduced through line 141. This mixture of fresh and regenerated catalyst with the Cottrell fines not only serves to add sufficient coarse material to obtain a desired catalyst consistency but it likewise raises the temperature of the fresh catalyst and Cottrell fines so that the resulting mixture will be about 820° F.

If the Cottrell precipitator were mounted at a sufficiently high elevation the pressure at the base of standpipe 143 might be sufficiently great to permit direct introduction of the catalyst fines mixture back to upper hopper in chamber 112. With the lower mounting the pressure at the base of standpipe 143 may be only about 6 or 7 pounds per square inch. We, therefore, pick up this catalyst mixture at the base of standpipe 143 with process steam introduced through line 144 and convey it through line 145 to an upper hopper 146, the separated steam being discharged through line 147 into line 128 and Cottrell precipitator 129. Standpipe 148 depending from hopper 146 may be of sufficient length, i. e., about 50 to 60 feet, to give a pressure at its base of about 12 or 13 pounds per square inch. Catalyst may be picked up from the base of this standpipe by steam introduced through line 149 and conveyed thereby through line 150 into separation chamber 112.

Instead of admixing the Cottrell fines with coarser catalyst and returning it to the system we may withdraw the catalyst fines and rework them into additional catalyst material of larger particle size. The catalyst fines may be incorporated into additional silica gel or mixed gels or it may be pelleted or agglomerated in any known manner and thereafter crushed, if necessary, to obtain the desired particle size. The particle size of catalyst charged to the system may vary through a considerable range and while in this example we employ catalyst of about 300 to 400 mesh or finer, it should be understood that we may entirely remove the finest catalyst powder and operate with a particle size of about 100 to 400 mesh or even of about 50 to 200 mesh. The vapor velocities in the reactor will, of course, be higher when coarser catalyst is employed but should in all cases be adjusted to give the desired dense phase conditions.

The catalyst in the used catalyst hopper and the fresh catalyst hopper must be maintained in aerated condition. Process steam from line 151 is employed for the aeration gas in the used catalyst hopper but air from line 152 may be used for aerating the fresh catalyst hopper. Aeration gases from the top of these hoppers may be withdrawn through lines 153, 154, 155 and 139 to the base of Cottrell precipitator 129. The catalyst in all of the standpipes is preferably aerated with process steam and as hereinabove described all of this aerating gas on the fresh and regenerated catalyst eventually passes through Cottrell precipitator 129 before it is discharged from the system.

Again it should be pointed out that our invention is not limited to the operating details hereinabove described. It has already been suggested that instead of using gas oil for absorbing heat in exchangers 19 and 23 we may utilize other heat exchange fluid. In fact, the surge drum 15 and the recycle lines associated therewith may be entirely eliminated and we may simply close the valve in line 17 and introduce water through line 17a, preferably water which has been previously treated or preheated. This water may be converted into steam at a pressure of about 135 to 150 pounds per square inch in exchangers 19 and 23 and the steam so generated may be introduced through line 21a to line 36 (the subsequent valve in line 21 being closed). A part of this steam may be introduced in coils 34b to facilitate vaporization of charging stock. Another part may be introduced through line 36a to steam superheating coils 37. Other parts may be withdrawn from the system through lines 36b and 36c as hereinabove described. When water is used instead of gas oil as a heat exchange medium in exchangers 19 and 23 the gas oil charge may be introduced directly from line 14 through line 14a to line 25 and thence to the furnace charge drum.

Also we have already indicated that a downward regeneration gas flow may be employed in exchanger 23 and that hopper 146 may be eliminated. Thus the regeneration gases from line 127 may be introduced through line 127a into the top of exchanger 23 and the cooled gases from this exchanger may be conducted directly by line 128a to the base of Cottrell precipitator 129. By employing a sufficiently tall standpipe 143 or by using a Fuller-Kenyon pump (a screw pump for forcing powdered solids into a zone of higher pressure) at the base of this standpipe, we may return the Cottrell fines mixture through line 145a and 150 back to chamber 112 without the necessity of employing hopper 146. Other modifications and alternative procedures will be apparent from the above description to those skilled in the art.

From the above description it will be seen that we have accomplished the objects of our invention and have provided a unique and remarkably effective commercial system. The heat of regeneration is utilized in the fractionation part of the system for obtaining product separation, it is utilized for supplying heat to the charging stock, and it is utilized for the generation of process steam which is employed throughout the system as a catalyst conveying and aerating medium. The catalyst storage and handling means provides a remarkably effective flexibility of control. Catalyst losses are reduced to a minimum.

We claim:

1. In apparatus of the class described, a gas oil surge drum, a steam generator, a pipe still, a catalyst regeneration system including a heat exchanger, a catalyst conversion system, a product fractionation system including a heat exchanger, means for passing gas oil from said surge drum through the heat exchanger included in said regeneration system whereby the gas oil is heated by the heat produced in the regeneration system, means for passing a part of said heated gas oil through said pipe still, thence through said conversion system and thence to said fractionation system, means for passing parts of said heated gas oil through the heat exchanger in said fractionation system and through said steam generator and thence back to said gas oil surge drum, means for introducing spent catalyst from the conversion system to the regeneration system and means for introducing regenerated catalyst from the regeneration system to the conversion system.

2. The apparatus defined by claim 1 which includes means for superheating the steam generated in said steam generator and means for introducing said superheated steam to both spent and regenerated catalyst for effecting aeration thereof.

3. A fluid-type catalytic cracking system which comprises a gas oil surge drum, a regeneration system containing a heat exchanger, a fractionation system containing a heat exchanger, a steam generation system, means for passing gas oil from said surge drum to the heat exchanger in the regeneration system, means for passing hot gas oil from the regeneration system heat exchanger to the fractionation system heat exchanger, means for passing gas oil from said regeneration system heat exchanger to said steam generator, and means for passing gas oil from said fractionation system heat exchanger and steam generator respectively back to said gas oil surge drum.

4. A catalytic cracking system which comprises a gas oil furnace charge drum, a pipe still furnace containing gas oil heater coils and steam superheater coils, a reactor, a spent catalyst separator above the reactor, a regenerator, a regenerated catalyst separator above the regenerator, a regenerated catalyst cooler below the regenerator, a regeneration gas heat exchanger, a product fractionation system including a plurality of heat exchangers, means for introducing a gas oil charging stock through some of said last named heat exchangers to said gas oil furnace charge drum and thence through said oil heater coils to said reactor, means for passing catalyst from the regenerated catalyst separator to said reactor along with the heated gas oil vapors from the pipe still coils, means for separating catalyst from reaction vapors in said spent catalyst separator, means for passing reaction products from said spent catalyst separator to said fractionation system, means for passing spent catalyst from said spent catalyst separator to said regenerator, means for recycling catalyst from said regenerator separator through said catalyst cooler and back to said regenerator, means for utilizing the heat abstracted from the catalyst in the catalyst cooler and from the gases in the regeneration gas exchanger for the generation of steam, means for passing a part of the generated steam through said steam superheating coils and means for introducing said superheated steam at a plurality of points in the system for maintaining catalyst in aerated form.

5. The method of effecting catalytic cracking which comprises maintaining a column of silica-alumina cracking catalyst in aerated condition at a temperature of about 1000° F., said catalyst having a particle size below about 100 microns, suspending catalyst from the base of said column in a stream of hydrocarbon charging stock which is higher boiling than gasoline, employing a catalyst-to-oil weight ratio in the general vicinity of 5:1, introducing the catalyst suspended in the charging stock stream at a low point in a conversion zone, maintaining a pressure in the conversion zone within the approximate range of atmospheric to 50 pounds per square inch, maintaining a temperature in said conversion zone in the general vicinity of 800° to 1000° F., passing hydrocarbon vapors upwardly through said conversion zone at a velocity in the general vicinity of 1 to 3 feet per second whereby a dense turbulent suspended catalyst phase is maintained the density of which is within the approximate range of about 10 to 25 pounds per cubic foot, maintaining a sufficient amount of said dense phase catalyst material in said zone to obtain a vapor contact time within the approximate range of 5 to 40 seconds, settling catalyst solids from upflowing vapors in a settling space above said dense catalyst phase, centrifugally separating residual catalyst material from vapors before they are discharged from the conversion zone, passing vapors from which catalyst has been centrifugally separated into a scrubbing zone, recycling liquid from the base of said scrubbing zone through a cooling zone and back to the scrubbing zone at a point above the point at which vapors are introduced thereto whereby residual catalyst material is scrubbed out of vapors in said scrubbing zone, returning catalyst scrubbed from said vapors to said conversion zone with charging stock introduced thereto, condensing and removing heavier-than-gasoline components in an initial fractionation zone immediately above and communicating with said scrubbing zone, removing substantially all gasoline boiling range hydrocarbons overhead from said fractionation zone through a cooling zone to a separating zone prior to subsequent fractionation whereby the scrubbing and initial fractionation are effected at a pressure below conversion pressure and said pressure is supplied by the pressure on stock charged to the conversion zone.

6. A catalytic cracking system which comprises a pipe still furnace containing gas oil heater coils and steam superheater coils, a reactor, spent catalyst separation means, a spent catalyst standpipe, a regenerator, a regenerated catalyst separation means, a regenerated catalyst standpipe, a regenerated catalyst cooler below the regenerator, a regeneration gas heat exchanger, a product fractionation system including a plurality of heat exchangers, means for introducing a gas oil charging stock through at least some of said last-named heat exchangers and thence through said oil heater coils to said reactor, means for passing separated regenerated catalyst from the regenerated catalyst standpipe to said reactor along with the heated gas oil vapors from the pipe still coils, means for passing separated spent catalyst from the spent catalyst standpipe along with air to said regenerator, means for passing reaction products from the spent catalyst separation means to said fractionation system, means for recycling separated regenerated catalyst through said catalyst cooler and back to said regenerator, means for utilizing the heat abstracted from the catalyst in the catalyst cooler and from the gases in the regeneration gas exchanger for the generation of steam, means for passing a part of the generated steam through said steam superheating coils and means for introducing said superheated steam into at least one of said standpipes for maintaining the catalyst in aerated form therein.

ROBERT C. GUNNESS.
JOSEPH W. JEWELL.